United States Patent
Niehr (10) Patent No.: US 10,286,590 B2
(45) Date of Patent: May 14, 2019

(54) DEVICE AND METHOD FOR PRODUCING STERILE CONTAINERS

(71) Applicant: KHS GMBH, Dortmund (DE)

(72) Inventor: Thomas Niehr, Bad Münster am Stein-Ebernburg (DE)

(73) Assignee: KHS GMBH, Dortmund (DE)

( * ) Notice: Subject to any disclaimer, the term of this patent is extended or adjusted under 35 U.S.C. 154(b) by 234 days.

(21) Appl. No.: 15/037,002

(22) PCT Filed: Nov. 18, 2014

(86) PCT No.: PCT/EP2014/003079
§ 371 (c)(1),
(2) Date: May 16, 2016

(87) PCT Pub. No.: WO2015/070991
PCT Pub. Date: May 21, 2015

(65) Prior Publication Data
US 2016/0288397 A1    Oct. 6, 2016

(30) Foreign Application Priority Data
Nov. 18, 2013  (DE) .......... 10 2013 019 169

(51) Int. Cl.
*B29C 49/46* (2006.01)
*B29C 49/42* (2006.01)
(Continued)

(52) U.S. Cl.
CPC .............. *B29C 49/46* (2013.01); *B29C 49/08* (2013.01); *B29C 49/12* (2013.01); *B29C 49/421* (2013.01);
(Continued)

(58) Field of Classification Search
CPC ....... B29C 49/42; B29C 49/46; B29C 49/421; B29C 49/4268; B29C 49/08; B29C 49/12;
(Continued)

(56) References Cited

U.S. PATENT DOCUMENTS 4,076,071 A   2/1978  Rosenkranz et al.
4,401,423 A   8/1983  Bellehache et al.
(Continued)

FOREIGN PATENT DOCUMENTS

DE    2352926 A1    4/1975
DE    4212583 A1    10/1993
(Continued)

*Primary Examiner* — Nahida Sultana
(74) *Attorney, Agent, or Firm* — Lucas & Mercanti, LLP; Klaus P. Stoffel (57) ABSTRACT

A method for handling at least sectionally sterile workpieces having a fillable inner volume, wherein the workpieces are each connected to a closure device, and by which the workpieces are guided through a plurality of treatment stations. One of the stations is a sterilization unit, wherein in at least one of the treatment stations, a treatment member is moved through a passage opening of the closure device all the way into the inner volume of the workpiece. The passage opening of the closure device is closed off by a closure element, which opens when the treatment member moves through and closes again upon removal of the member, wherein the closure device sealingly closes the inner volume of the workpiece with respect to an external region.

14 Claims, 6 Drawing Sheets

(51) Int. Cl.
*B29C 49/08* (2006.01)
*B29C 49/12* (2006.01)
*B29C 49/58* (2006.01)
*B29K 67/00* (2006.01)
*B29L 31/00* (2006.01)
*B29K 23/00* (2006.01)
*B29C 49/06* (2006.01)

(52) U.S. Cl.
CPC ...... *B29C 49/4205* (2013.01); *B29C 49/4268* (2013.01); *B29C 49/06* (2013.01); *B29C 2049/4635* (2013.01); *B29C 2049/4682* (2013.01); *B29C 2049/5806* (2013.01); *B29C 2049/5827* (2013.01); *B29K 2023/12* (2013.01); *B29K 2067/003* (2013.01); *B29L 2031/712* (2013.01)

(58) Field of Classification Search
CPC .... B29C 2049/5806; B29C 2049/5827; B29C 2049/4682
See application file for complete search history.

(56) References Cited

U.S. PATENT DOCUMENTS

| | | | |
|---|---|---|---|
| 5,346,386 A | 9/1994 | Albrecht et al. | |
| 5,643,026 A | 7/1997 | Weiss | |
| 6,692,684 B1 | 2/2004 | Nantin et al. | |
| 2002/0171179 A1* | 11/2002 | Dundas | A61L 2/04 264/525 |
| 2004/0222224 A1 | 11/2004 | Plester | |
| 2006/0115546 A1* | 6/2006 | Santais | B29C 49/58 425/3 |
| 2010/0047120 A1 | 2/2010 | Adriansens et al. | |
| 2010/0089009 A1 | 4/2010 | Till | |
| 2010/0244298 A1* | 9/2010 | Mie | B29C 49/4205 264/40.7 |
| 2011/0133370 A1 | 6/2011 | Engelhard et al. | |
| 2012/0114783 A1* | 5/2012 | Lambert | B29C 49/58 425/535 |
| 2013/0122136 A1* | 5/2013 | Fevre | B29C 49/46 425/535 |
| 2013/0328248 A1 | 12/2013 | Herold et al. | |
| 2014/0044597 A1 | 2/2014 | Mie | |
| 2015/0190959 A1* | 7/2015 | Deau | B29C 49/783 264/40.3 |
| 2016/0332357 A1* | 11/2016 | Gendre | B29C 49/4289 |

FOREIGN PATENT DOCUMENTS

| | | |
|---|---|---|
| DE | 4340291 A1 | 6/1995 |
| DE | 29503830 U1 | 6/1995 |
| DE | 19641943 A2 | 4/1998 |
| DE | 19906438 A1 | 8/2000 |
| DE | 10035572 A2 | 1/2002 |
| DE | 102007017938 A1 | 10/2008 |
| DE | 102008038143 A2 | 2/2010 |
| EP | 1258336 A1 | 11/2002 |
| EP | 1086019 B1 | 9/2005 |
| EP | 1896245 A1 | 3/2008 |
| EP | 2138298 A2 | 12/2009 |
| FR | 2923802 A2 | 5/2009 |
| JP | 2006518317 A | 8/2006 |
| JP | 2013035562 A | 2/2013 |
| WO | 2010012915 A1 | 2/2010 |
| WO | 2010020530 A1 | 2/2010 |
| WO | 2012083910 A2 | 6/2012 |

* cited by examiner

DEVICE AND METHOD FOR PRODUCING STERILE CONTAINERS

The present application is a 371 of International application PCT/EP2014/003079, filed Nov. 18, 2014, which claims priority of DE 10 2013 019 169.6, filed Nov. 18, 2013, the priority of these applications is hereby claimed and these applications are incorporated herein by reference.

BACKGROUND OF THE INVENTION

The invention relates to a method for handling workpieces which are sterile at least in regions and have a finable inner volume, in which the workpieces are connected to a closure device together with which the workpieces are guided through a plurality of treatment stations, wherein one of the treatment stations is a sterilization unit, and wherein, in at least one of the treatment stations, a treatment member is moved through a Passage opening in the closure device into the inner volume of the workpiece. In particular, the invention relates to a method for handling preforms composed of a thermoplastic material for producing blow molded containers which are sterile at least in regions, and/or to a method for handling containers produced in a blow-molding manner from preforms. The preforms are guided here in particular through a plurality of treatment stations of a blow molding machine, namely at least through a sterilization unit in which the preforms are subjected to a sterilization treatment. Furthermore, said preforms can be guided through a heating unit in which the preforms are conditioned thermally for the blow molding, and/or through a blow molding station in which the preforms are blow molded to form containers, and/or through inlet, discharge and/or transfer star wheels in which the preforms and/or the containers are transported.

The invention furthermore relates to a closure device for handling a workpiece which is sterile at least in regions and has a fillable inner volume, with connecting means for the releasable connection of the workpiece to the closure device, wherein the closure device has a passage opening which is provided with sealing means and through which a treatment member of a treatment station can be moved in a sealed manner into the inner volume of the workpiece. The workpieces here are in particular preforms composed of a thermoplastic material for producing blow molded containers which are sterile at least in regions, and/or containers produced in a blow-molding manner from preforms. The treatment stations belong in particular to a blow molding machine and comprise at least one sterilization unit in which the preforms are subjected to a sterilization treatment, optionally additionally a heating unit in which the preforms are conditioned thermally for the blow molding, and/or additionally a blow molding station in which the preforms are blow molded to form containers, and/or additionally inlet, discharge and/or transfer star wheels in which the preforms and/or the containers are transported.

Finally, the invention relates to a blow molding machine with a closure device and to the use of a closure device and a blow molding machine for carrying out a handling method.

The invention is explained below primarily with reference to the sequences and operations during the blow-molding production of containers, which are sterile at least in regions, from preforms and the subsequent filling of said containers, without the invention and the claims being restricted thereto. In an analogous manner, the invention can also be realized in fillers and closers.

Production of sterile, blow molded containers typically takes place in such a manner that said containers are sterilized after the blow molding thereof and prior to filling, using hydrogen peroxide or other chemicals. It is likewise already known to sterilize the preforms, which are used as the starting product in the blow molding of the containers, by means of radiation, in particular the region of the inner and outer surface of said preforms.

In the case of container molding by the effect of blow molding pressure, preforms composed of a thermoplastic material, for example preforms composed of PET (polyethylene terephthalate) are supplied to different treatment stations within a blow molding machine. A blow molding machine of this type typically has a heating unit and a blow molding unit, in the region of which the previously temperature-conditioned preform is expanded by biaxial orientation to form a container. The expansion takes place with the aid of compressed air which is introduced into the preform to be expanded. The process sequence during such an expansion of the preform is explained in DE-A 43 40 291. However, blow molding machines are also known in which the expansion takes place by feeding in a liquid under a positive pressure, in particular by feeding in the filling material under a positive pressure.

The basic design of a blow molding station operating with compressed air for molding containers is described in DE-A 42 12 583. Possibilities for temperature conditioning of the preforms are explained in DE-A 23 52 926.

Within the blow molding machine, the preforms and the blow molded containers can be transported with the aid of different handling units. The use of conveying mandrels, onto which the preforms are plugged, has proven particularly successful. However, the preforms may also be handled using other handling units. The use of gripping tongs for handling preforms, and the use of expanding mandrels, which can be inserted into the mouth region of the preform for holding the latter, likewise belong to the available constructions.

Handling of containers using transfer wheels is described, for example, in DE-A 199 06 438, in an arrangement of the transfer wheel between a blow molding wheel and a discharge section.

It is also known, for the handling of the preforms, to first of all place the latter onto a carrying device, and then to carry out the handling at the carrying device and the preform carried by the latter. Such a carrying device is explained in DE 196 41 943 A1.

The handling of the blow molded containers generally takes place in the same manner as the handling of the preforms because the handling contours and handling portions provided on the preform for the handling remain unchanged during the blow molding operation and are therefore also available on the blow molded container for handling.

With regard to the blow molding stations used, in which the preforms are formed into containers using a pressurized fluid, various embodiments are known. In the case of blow molding stations which are arranged on rotating transport wheels, a book-like opening capability of the mold carriers may frequently be encountered. However, it is also possible to use mold carriers which are displaceable relative to one another or guided in another manner. In the case of positionally fixed blow molding stations, which are suitable in particular for receiving a plurality of cavities for molding containers, plates which are arranged so as to be mutually parallel are typically used as mold carriers.

In terms of the sterilization of preforms, various methods and devices are known from the prior art. For example, EP-A 1 086 019 A1 describes the sterilization of hot preforms with a hot gaseous sterilization agent. Use is made of separate treatment stations arranged consecutively, namely a first heating module, a sterilization module and a second heating module. The temperature behavior of the preform during the sterilization operation and the uncontrolled leakage of the sterilization agent out of the preform within the heating system are disadvantageous here. There is furthermore the possibility of new microbial contamination, for example as early as in the second heating module.

EP-A 1 896 245 A2 describes a method in which, prior to the heating, a gaseous sterilization agent is introduced into a cold preform and condenses there. A problem here is ensuring complete formation of condensate on the entire inner surface of the preform since the inflowing hot sterilization agent increases the temperature of the inner wall of the preform. Furthermore, here too the sterilization agent, after evaporation thereof in the region of the heating system, leaks in an uncontrollable manner out of the preform within the heating system. The problem of new microbial contamination in the heating system likewise continues to exist.

The arrangement of a sterilization unit between a heating system and the blow molding module is described in WO 2010/020530 A1. In the case of this method, the amount of sterilization agent admitted into the region of the blow molding unit can be predicted only with difficulty. Furthermore, the amount of sterilization agent escaping into the environment cannot be controlled and corresponding contamination is not excluded. The problem of new microbial contamination, for example after the blow molding, is also not effectively countered here.

It is also known to use radiation sources for sterilization purposes. The use of UV emitters for sterilization tasks is generally known, for example, from DE 295 03 830 U1. A space which is enclosed by a protective housing is intended to be sterilized by irradiation with UV light. This document does not disclose sterilizing preforms or containers, or blow molding machine elements coming into contact therewith. DE 10 2008 038 143 A1 discloses that UV radiation emitters can be used for sterilizing the outer wall of preforms.

DE 10 2007 017 938 B4 discloses the use of radiation emitters for sterilizing the inner surfaces of preforms. For this purpose, a sterilization probe which carries a radiation emitter is inserted into the preform to be sterilized. WO 2010/012915 A1 and EP 2 138 298 A2, in which, for internally sterilizing a preform, a radiation source is likewise inserted into the mouth of the preform, also show comparable prior art. It is stated in the last-mentioned document that a plurality of sterilization units should be provided, namely at least one upstream of the unit in which the preforms are formed to form containers, and at least one downstream thereof. It is considered to be disadvantageous in particular in the last-mentioned prior art that a high outlay on apparatus is required.

A fundamental problem is that preforms or containers sterilized in a sterilization station have to be protected from new microbial contamination on their further transport route. It is an aim to be able to decant a germ-sensitive beverage under aseptic filling conditions. This requires at least one germ-free container. To this extent, it is not sufficient only to sterilize the preform or the blow molded container. To avoid new microbial contamination, at least those elements of the blow molding machine which, after the sterilization of the preform, come into contact with the preform, also have to be kept sterile. In the prior art, for example in EP 2 138 298 A2, this problem is countered by the fact that a sterile housing is provided which surrounds the blow molding machine and has to be kept sterile with a considerably outlay. The interior of said sterile housing is sterilized with all of the equipment located therein and then the entire interior is protected against new microbial contamination. The outlay on construction and energy are enormous and contribute considerably to the production costs. In addition, the same document proposes undertaking a second sterilization step after the blow molding operation. This also means a considerable additional outlay.

A better solution for preventing new microbial contamination is disclosed in WO 2012/083910 A1. A sterile space surrounding the blow molding machine and optionally further treatment stations, such as fillers or closers, is not provided there; instead, a channel which conducts sterile gas and along which the preform or the blow molded container is guided, is shown there. The channel is provided with outlet openings out of which the sterile gas can flow in order to produce a corridor acted upon with sterile gas. The preform or the container is guided in said sterile gas corridor and, in the process, is acted upon and flowed around by the sterile gas. New microbial contamination is thereby effectively prevented. Nevertheless, a further outlay is also required here.

SUMMARY OF THE INVENTION

It is therefore the object of the present invention to specify a method with which, in a simple manner, production of sterile preforms or sterile containers is successful and new microbial contamination on the further transport path of the preforms or containers can be prevented. This object can be generalized to any workpieces in which the problems described above occur in the same manner. It is a further object of the present invention to specify corresponding devices with which the method according to the invention can be carried out.

According to the method according to the invention, the passage opening in the closure device is closed by a closure element which opens when the treatment member is passed through the opening and closes again when the member is removed, wherein the closure device closes the inner volume of the workpiece in relation to an external region in a sealed manner. It is thereby possible to isolate the inner volume of the workpiece in relation to an environment and, if required, nevertheless to ensure access to the inner volume, for example in order to carry out sterilization or in order to pass a stretching rod therethrough during the blow molding process or for feeding in the pressurized blow molding fluid. After sterilization of a preform, the isolated region is sterile and is closed off from the environment. The preform and the closure device carry along said inner clean space enclosed therebetween and complicated measures for producing a voluminous outer sterile region are not required. Neither the blow molding machine nor a filler or a closer and transport paths located in between necessarily have to be kept sterile over a large area as long as the sterile space enclosed between preform and/or container, on the one hand, and closure device, on the other hand, is maintained. In very general terms, this inventive concept is based on the idea that the sterile space revolves with and is carried by the preform or by the container, namely by a sterile space being enclosed between preform or container and the closure device. The closure device closes off said sterile space from the environment and provides a lock function in order, for example, to ensure passage for treatment members. The closure elements which control an opening of the closure device ensure said lock function.

A further advantage of the present invention consists in that, for example, a mold change or other production adjustments are possible without rupturing the sterile space because no surrounding sterile space is required for the blow molding or filling machine. The re-equipment times and re-equipment costs can be considerably reduced.

The advantages of the device according to the invention and of the use according to the invention are the same.

The risk of new microbial contaminations is minimized by the preform (or the container) being connected to the closure device before sterilization takes place in the sterilization unit, in particular wherein, in the sterilization unit, a sterilization member is guided through the passage opening in the closure device in order to introduce a sterilization agent into the inner volume of the preform. In this manner, the closure device is also sterilized at the same time in the same process step at least in the regions facing the preform. Depending on the arrangement of the sterilization unit in the blow molding machine, it may be advantageous for this to take place upstream of the heating unit. It is conceivable, for example, for the preform transport through the blow molding machine from the inlet to the outlet region to take place exclusively with the closure device being connected to the preform.

It is considered in particular to be advantageous that the connection between closure device and preform or container is released at the earliest after the departure from the blow molding station, in particular wherein the connection is released only after the blow molded container has been filled with a filling product. The advantages of the enclosed sterile space between the two connection partners is thereby maintained for as long as possible and an aseptically operating blow molding and filling unit can be achieved.

In principle, the closure device could be connected to the preform or the container, as known from clamping mandrels. However, the connection advantageously takes place on the outer side of the workpiece (container, preform), for example at the handling ring thereof and/or at the external thread, which have sufficient stability and a suitable contour therefor. In this manner, even various regions which are critical for sterility also remain accessible during the sterilization operation.

The sealing of the closure device on the workpiece preferably also takes place at the handling ring of the workpiece and/or at that end of the external thread which faces away from the mouth. In addition to the advantages mentioned in the previous paragraph, it is thereby possible also to specifically guide the sterilization agent over the threaded region, for example if the sterilization agent is a chemical sterilization agent, in particular hydrogen peroxide in a flowable state of aggregation, wherein in particular, the sterilization agent is guided along the external thread of the preform after passing through the inner volume of the preform. For this purpose, the closure device can have, for example, a suitable guide contouring which permits a reverse flow of the sterilization agent in a workpiece-side portion in the region of the thread of the preform, for example through a reverse flow channel opening there.

The closure devices are advantageously guided in a circuit. In a first portion of the circuit, the closure devices are connected to workpieces; in a second portion, i.e. after the workpieces have been removed, the closure devices revolve without a workpiece. In particular, in order to avoid new microbial contamination of the closure devices, it is provided that sterilization of the closure devices advantageously takes place in the second portion of revolving without a workpiece. This can take place in a known manner, for example, by using chemical sterilization agents, for example using hydrogen peroxide. Sterilization using sterilizing radiation is also possible, in particular using UV radiation. UV emitters can be used in a structural simple manner. Suitable UV emitters are known in the prior art, for example UV LEDs, amalgam low-pressure lamps, mercury vapor lamps (low pressure, medium pressure, high pressure and super high pressure), excimer lasers and diode lasers.

Use is preferably made of UV emitters as radiation sources which emit radiation in particular in a wavelength range suitable for the sterilization, for example in the range of 180-300 nm, whether narrow band or broad band. It is considered optimal if the radiation has an intensity power in the range of 220 nm and/or 265 nm. Furthermore, sterilization with other media acting in a germ-curing manner, such as, for example, a plasma, which is produced in the workpiece (preform/container) or is produced externally and is introduced into the workpiece, is conceivable.

The new microbial contamination of workpieces (preforms/containers) which are already sterilized can be prevented even better by a positive pressure being produced in the space enclosed between workpiece and closure device. This is made possible in a simple manner, for example at the end of the blow molding process, by the blow molding pressure being discharged only up to a certain pressure which is higher than the external pressure. It is also conceivable to produce a positive pressure directly during the sterilization, for example by the sterilization agent being supplied under a positive pressure and a positive pressure being maintained in the workpiece at the end of the sterilization step. For this purpose, the sterilization agent can also be flushed out of the preform at the end of the sterilization step with a sterile gas, for example with sterile air, for example with sterile gas remaining in the preform under a positive pressure. The method according to the invention can also be further improved in that at least that region of the stretching rod which penetrates the region enclosed between workpiece and closure device is subjected to sterilization before or during the blow molding step.

BRIEF DESCRIPTION OF THE DRAWING

The invention will be explained in more detail below with reference to exemplary embodiments. Exemplary embodiments of the invention are schematically illustrated in the drawings, in which.

DETAILED DESCRIPTION OF THE INVENTION

Figure 1:
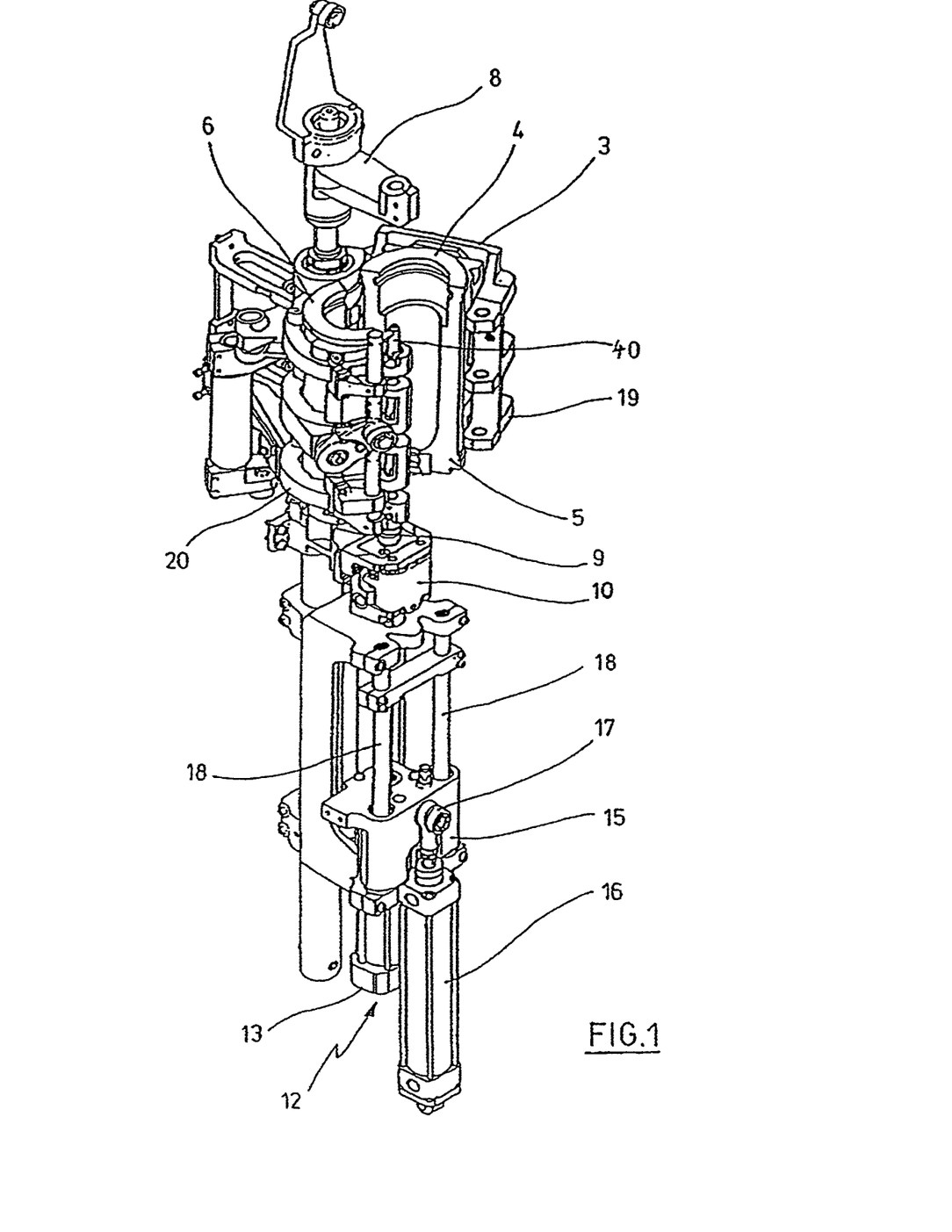
FIG. 1 shows a perspective illustration of a blow molding station for producing containers made from preforms.
Figure 2:
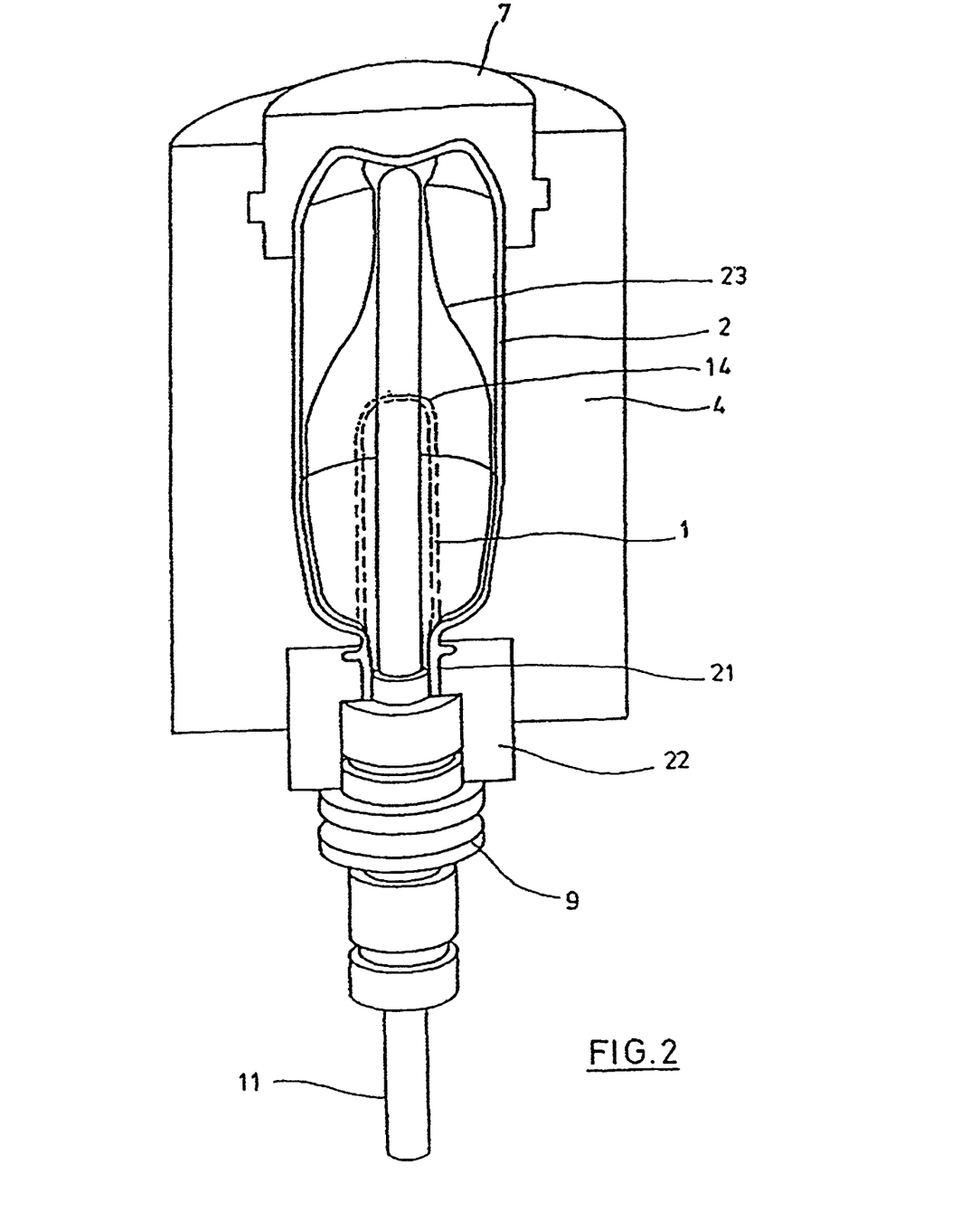
FIG. 2 shows a longitudinal section through a blow mold in which a preform is stretched and expanded.

The basic design of a device for forming preforms 1 into containers 2 is illustrated in FIG. 1 and in FIG. 2.

The device for molding the container 2 (blow molding machine) substantially comprises a blow molding station 3 which is provided with a blow mold 4 into which a preform 1 can be inserted. The preform 1 can be an injection-molded part composed of polyethylene terephthalate. In order to enable insertion of the preform 1 into the blow mold 4, and in order to enable removal of the finished container 2, the blow mold 4 is composed of mold halves 5, 6 and of a base part 7, which can be positioned by a lifting device 8. The preform 1 can be held in the region of the blow molding station 3 by a conveying mandrel 9 which, together with the preform 1, passes through a plurality of treatment stations within the device. However, it is also possible to insert the preform 1 directly into the blow mold 4, for example via tongs or other handling means.

In order for a compressed air supply line to be permitted, a connection piston 10, which supplies compressed air to the preform 1 and at the same time undertakes sealing relative to the conveying mandrel 9, is arranged below the conveying mandrel 9. However, it is also conceivable in a modified construction, in principle to use fixed compressed air supply lines.

Stretching of the preform 1 take place with the aid of a treatment member/stretching rod 11 which is positioned by a cylinder 12. In principle, however, it is also conceivable to carry out mechanical positioning of the stretching rod 11 via curved segments which are acted upon by tracking rollers. The use of curved segments is expedient in particular whenever a plurality of blow molding stations 3 are arranged on a rotating blow molding wheel. The use of cylinders 12 is expedient if blow molding stations 3 arranged in a positionally fixed manner are provided.

In the embodiment illustrated in FIG. 1, the stretching system is designed in such a manner that a tandem arrangement of two cylinders 12 is provided. Before the beginning of the actual stretching operation, the stretching rod 11 is initially moved by a primary cylinder 13 into the region of a base 14 of the preform 1. During the actual stretching operation, the primary cylinder 13, with the stretching rod 11 extended, is positioned together with a carriage 15, which carries the primary cylinder 13, by a secondary cylinder 16 or via a cam controller. In particular, it is conceivable to use the secondary cylinder 16 in a cam-controlled manner such that a current stretching position is predetermined by a guide roller 17 which slides along a curved track while the stretching operation is being carried out. The guide roller 17 is pressed against the guide track by the secondary cylinder 16. The carriage 15 slides along two guide elements 18.

After the mold halves 5, 6 arranged in the region of carriers 19, 20 have been closed, the carriers 19, 20 are locked relative to each other with the aid of a locking unit 40.

For adaptation to various shapes of a mouth portion 21 of the preform 1, the use of separate threaded inserts 22 in the region of the blow mold 4 is provided according to FIG. 2.

In addition to the blow molded container 2, FIG. 2 also shows the preform 1 by dashed lines and, schematically, a container bubble 23 being formed.

Figure 3:
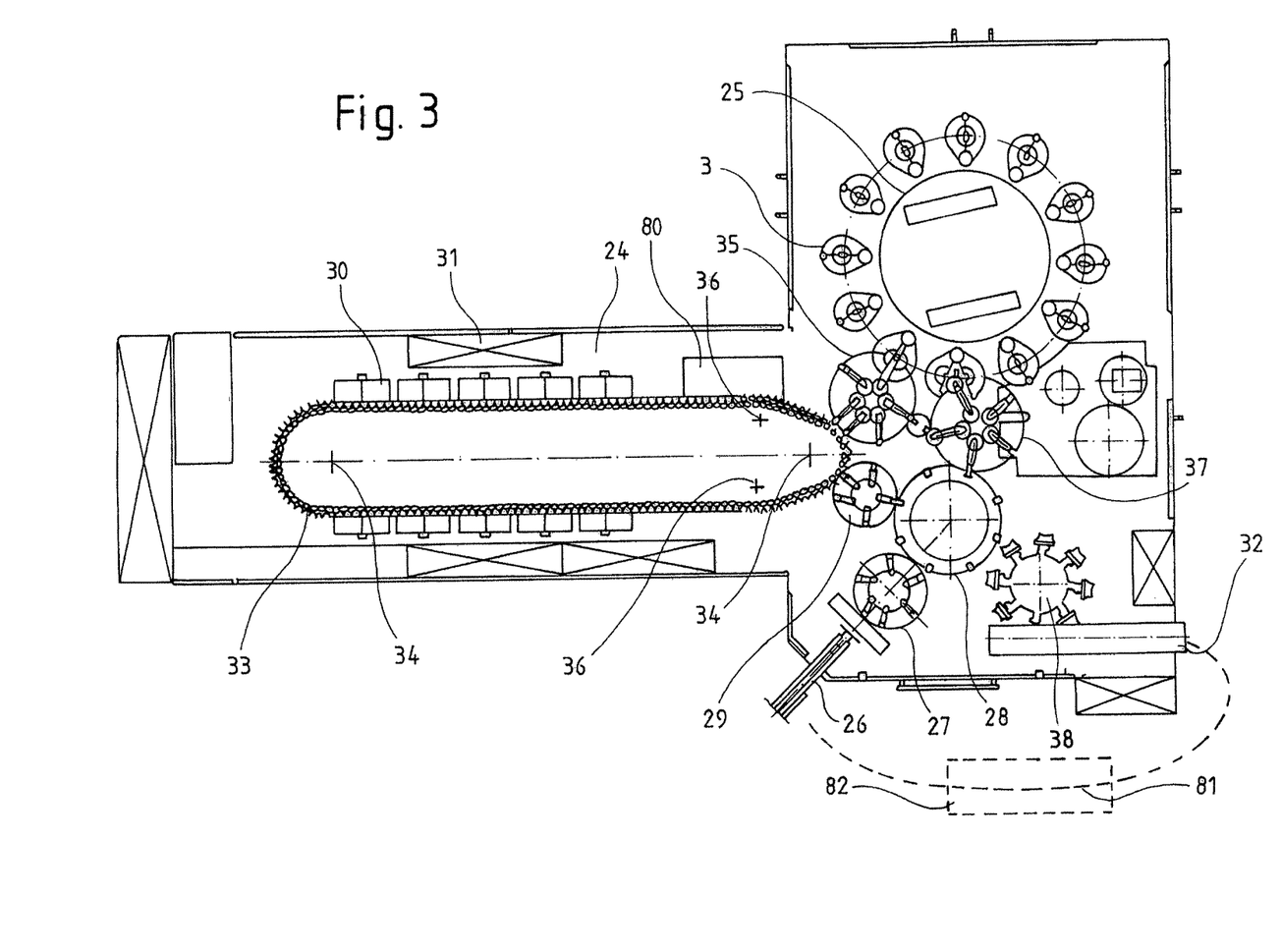
FIG. 3 shows a sketch for illustrating a basic design of a device for blow molding containers.

FIG. 3 shows the basic design of a blow molding machine which is provided with a heating section 24 and a rotating blow molding wheel 25. Starting from a preform infeed 26, the preforms 1 are transported into the region of the heating section 24 by transfer wheels 27, 28, 29. Heating radiators 30 and blowers 31 are arranged along the heating section 24 in order to control the temperature of the preforms 1. After the temperature of the preforms 1 has been adequately controlled, the latter are transferred to the blow molding wheel 25, in the region of which the blow molding stations 3 are arranged. The finished blow molded containers 2 are supplied to a discharge section 32 by further transfer wheels.

In order to be able to form a preform 1 into a container 2 in such a manner that the container 2 has material properties which ensure a long shelf life of foodstuffs, in particular beverages, which are decanted into the container 2, special method steps have to be adhered to when heating and orienting the preforms 1. Furthermore, advantageous effects can be achieved by adhering to special dimensional rules.

Various plastics can be used for the thermoplastic material. For example, PET, PEN or PP can be used.

Expansion of the preform 1 during the orientation operation takes place by supplying compressed air. The supply of the compressed air is divided into a pre-blowing phase, in which gas, for example compressed air, is supplied at a low pressure level, and into a subsequent main blowing phase, in which gas is supplied at a higher pressure level. During the pre-blowing phase, compressed air is typically used at a pressure in the range of 10 bar to 25 bar, and, during the main blowing phase, compressed air is supplied at a pressure in the range of 25 bar to 40 bar. To achieve aseptic blow molding conditions, use is made, for example, of sterile compressed air.

It can likewise be seen in FIG. 3 that, in the embodiment illustrated, the heating section 24 is formed from a plurality of revolving transport elements 33 which are strung together in a chain-like manner and are guided along deflection wheels 34. In particular, it is conceivable for a substantially rectangular basic shape to be defined by the chain-like arrangement. In the case of the embodiment illustrated, a single deflection wheel 34 which is of relatively large dimensions is used in the region of that extent of the heating section 24 which faces the transfer wheel 29 and an infeed wheel 35, and deflection wheels 36 which are of comparatively smaller dimensions are used in the region of adjacent deflections. In principle, however, any other guides are also conceivable.

In order to permit as tight an arrangement of the transfer wheel 29 and of the in feed wheel 35 as possible relative to each other, the arrangement illustrated has proven particularly expedient since three deflection wheels 34, 36 are positioned in the region of the corresponding extent of the heating section 24, specifically in each case the smaller deflection wheels 36 in the region of the transition to the linear courses of the heating section 24, and the larger deflection wheel 34 in the immediate transfer region to the transfer wheel 29 and to the in feed wheel 35. As an alternative to the use of chain-like transport elements 33, it is also possible, for example, to use a rotating heating wheel.

After the blow molding of the containers 2 has been completed, the latter are guided out of the region of the blow molding stations 3 by a retrieval wheel 37 and transported via the transfer wheel 28 and a discharge wheel 38 to the discharge section 32.

Figure 4:
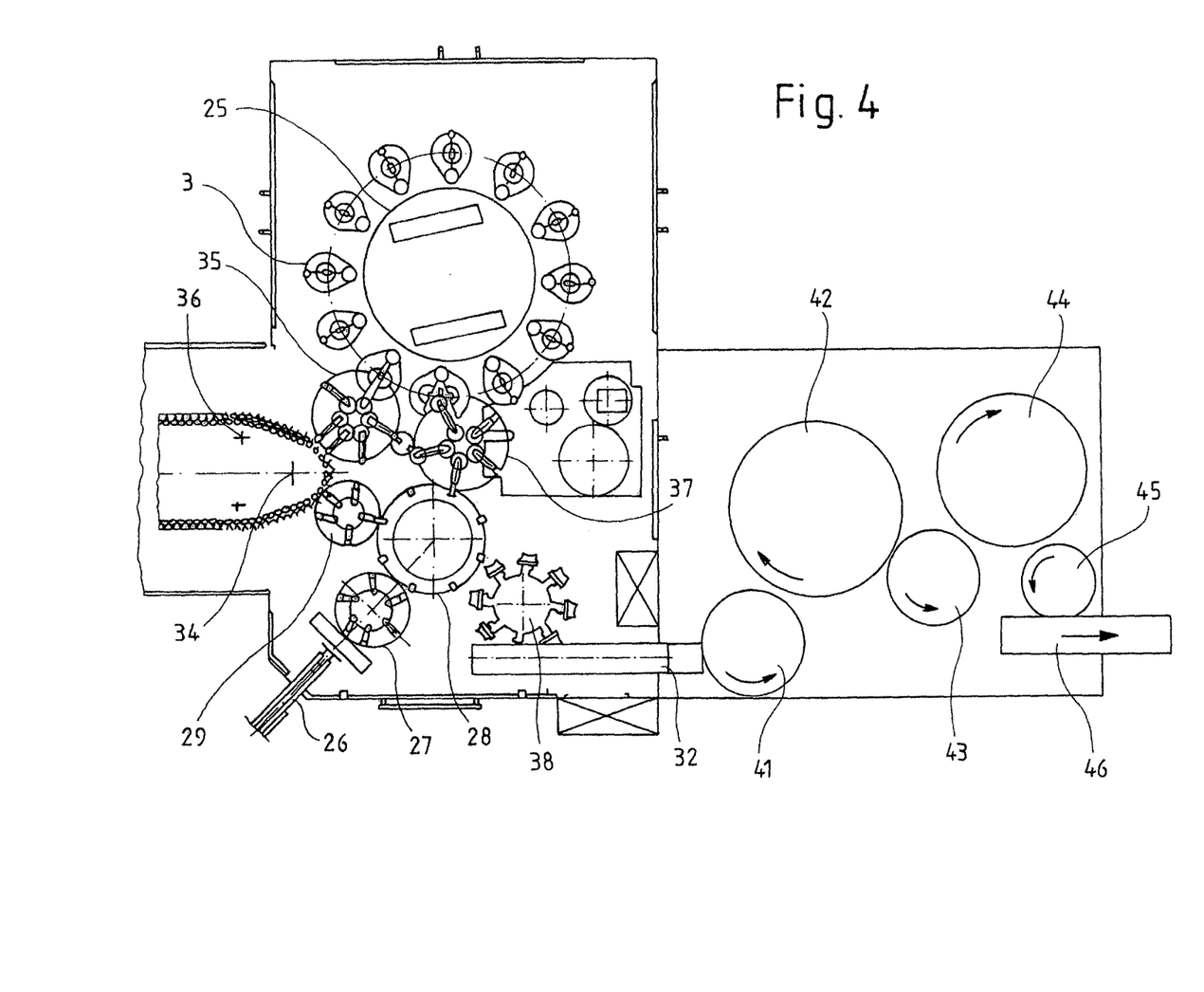
FIG. 4 shows a modified device according to FIG. 3 with an additional filler and closer unit.

In the modified blow molding machine illustrated in FIG. 4, the discharge section 32 is adjoined in an interlocked manner by a filler and closer unit. A transfer wheel 31 removes the blow molded containers 2 from the discharge section 32 and transfers said containers to the rotating filler wheel 42 on which a plurality of revolving filling stations with filling members are arranged. After the filling operation has been completed, the filled, but not yet closed containers 2 pass through the further transfer star wheel 43 to the closer unit 44, which is likewise formed in a rotating manner with closing stations and in which the containers 2 are closed, for example by closure caps being screwed thereon. After passing through the removal star wheel 45, the filled and closed containers 2 leave the filler and closer unit via the discharge unit 46.

Figure 5:
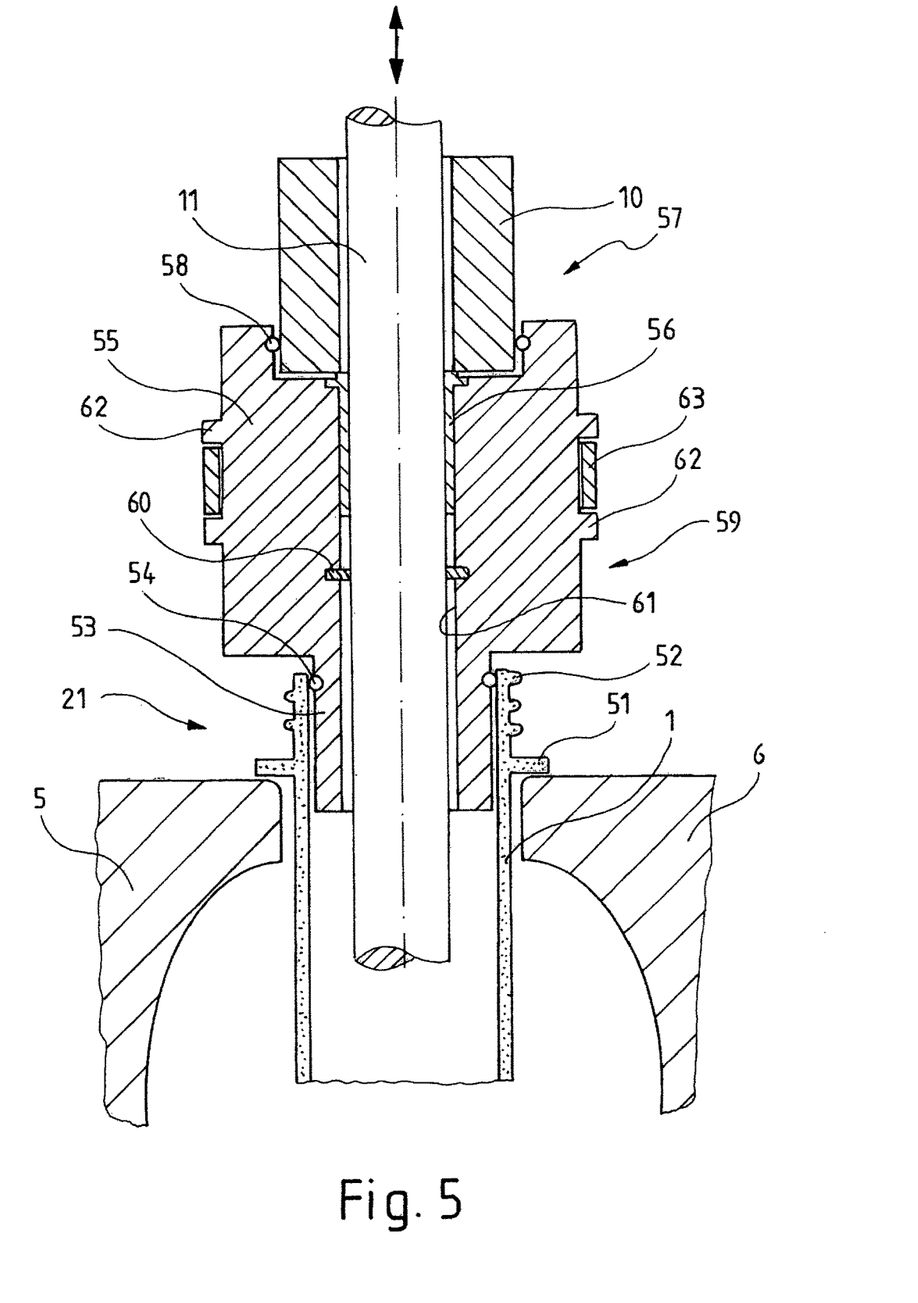
FIG. 5 shows a schematic illustration of a first exemplary embodiment of a closure device with a workpiece held by the latter.

FIG. 5 shows, in a schematic illustration, a first exemplary embodiment of a closure device according to the invention, which is designed as a carrying element 59 for a workpiece without restricting the basic inventive concept. The carrying element 59 according to the invention is shown with a workpiece, which it holds, in the form of a preform 1, of which only the mouth region 21 with a neck ring 51 and an external thread 52 is illustrated. The preform 1 is illustrated arranged in a blow molding station 3 with the blow mold halves 5, 6.

The carrying element 59 projects with a holding portion 53 through the mouth 21 into the interior of the preform. The preform 1 is clamped on an elastic sealing ring 54, which is arranged on the outer side of the holding portion 53, and is held as a result by the carrying element 59, which is designed in the manner of a clamping mandrel. The carrying element 59 has as a passage opening 61, over the entire axial extent thereof, a central bore which extends on the preform side from the holding portion 53 through the main body 55 as far as the end thereof facing away from the preform. Said end of the passage opening 61 that faces away from the preform is closed in a basic state against the entry of germs by a duckbill valve 56.

In the illustrated state of FIG. 5, a blow molding nozzle 10 bears against a contact portion 57 of the main body 55. A sealing ring 58 which is arranged on the contact portion 57 ensures pressure-tight sealing between the main body 55 and the blow molding nozzle 10. A stretching rod 11 passes through the blow molding nozzle 10 and, during insertion into the passage opening 61, has moved the duckbill valve 56 into the open state shown. After removal of the stretching rod, the duckbill valve 56 automatically returns into the closed state. The stretching rod 11 serves in a known manner for stretching the preform 1 during the desired biaxial orientation of the preform material during the blow molding process. The stretching rod 11 passes through the entire length of the passage opening 61. The stretching rod 11 is sealed here by means of an annular lip seal 60 which extends in a cross-sectionally constricting manner radially inward from the main body 55 into the passage opening 61 such that compressed air which is supplied, for example sterile compressed air supplied through the stretching rod, cannot escape.

For the purpose of handling by handling means of the blow molding machine, the main body 55 has, on the cylindrical side surfaces thereof, handling elements in the form, in the exemplary embodiment shown, of two ribs 62 which are spaced apart and therefore equidistant in a horizontal plane and at which engagement can take place in a handling manner, for example by tong-like handling means known in the prior art. In addition, a magnetic ring 63 is arranged between said ribs 62, and therefore a magnetic handling engagement is also possible.

Figure 6:
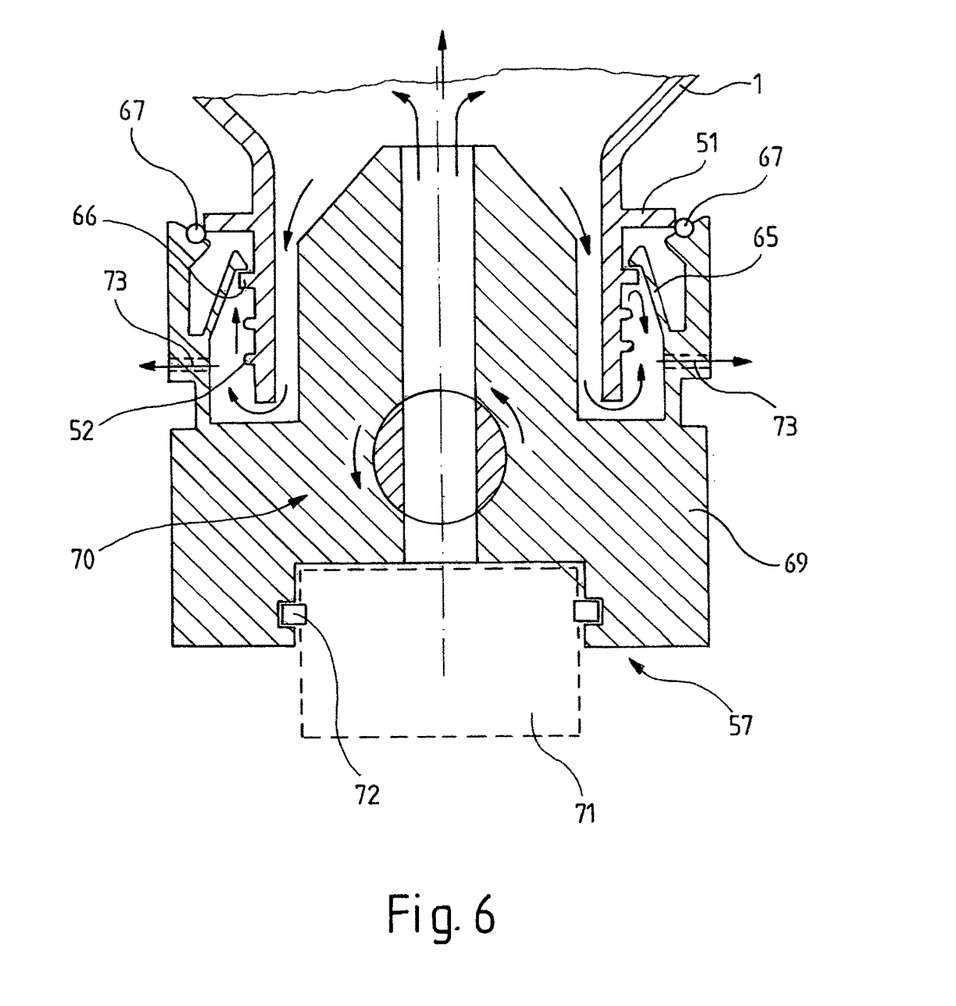
FIG. 6 shows a schematic illustration of a second exemplary embodiment of a closure device.

FIG. 6 shows, in a schematic illustration, a second exemplary embodiment of a closure device according to the invention and likewise designed as a carrying element 69. Unlike in FIG. 5, the carrying element does not engage in the preform 1, but rather engages on the outside of the preform 1. Radially resilient latching lugs 65 engage behind the encircling securing ring 66 arranged at the bottom end of the thread 52 while a sealing element 67 of the carrying element 69 is pressed against the neck ring 51 of the preform 1. The central passage opening 61 of the supporting element 69 is controlled by a ball valve 70 which is shown in an open state suitable for the passage of a treatment member or for the introduction of a medium. When the ball valve 70 is closed and because of the sealing contact of the carrying element 69 with the preform 1, the interior of the preform is closed off from an external region; an entry of germs is reliably prevented.

The carrying element 69 also has, on the side thereof facing away from the preform, a contact region 57 to which a sterilization member 71 is connected in a sealed manner. Sealing also takes place here between the carrying element 69 and sterilization member 57 by means of an annular seal 72 arranged in between. Said annular seal 72 can optionally be arranged on the sterilization member 71 or, as illustrated, on the carrying element 69.

A sterilizing chemical fluid is fed by the sterilization member 71 into the passage opening 61 and exits into the preform 1 in the direction of the depicted arrows. In the example shown, the flow conduction is selected in such a manner that the sterilizing fluid, after exiting from a mandrel-like region of the carrying element 69 projecting into the preform 1, initially flows in the base direction of the preform 1 in order to reliably and as completely as possible brush over and sterilize the inner wall of the preform 1. The reverse flow of the sterilizing fluid takes place along the outside of the mandrel-like region; as a result, the fluid also brushes over those regions of the carrying element 69 which are critical in terms of germs and face the preform 1, and also leads here to a desired freedom from germs. The fluid flows out of the preform 1 and is conducted along the external thread 52 in the arrow direction by means of a channel formed between the preform 1 and the carrying element 69 before said fluid can escape or is returned through outlet openings 73 of the carrying element 69. The outlet opening 73 is secured (in a manner not illustrated) against the penetration of germs, for example by means of a nonreturn valve.

With reference to FIGS. 3 and 4, the carrying element according to the invention can also be connected, for example, upstream of the heating section 24 in the region of the inlet star wheel 27 to the entering preforms 1. The further handling could then take place by engagement in the carrying element. After carrying element and preform 1 are connected, the interior enclosed by said two connected elements is protected against the penetration of germs.

The connection of preform and carrying element is intended to take place upstream of the sterilization unit 80 which, in the exemplary embodiment illustrated in FIG. 3, is illustrated arranged in the discharge-side region of the heating section 24. After passage through the sterilization unit 80, the closed interior of the preform 1 is free from germs and is kept free from germs over the further transport path thereof by the carrying element. In a possible refinement of the invention, the connected unit consisting of preform 1 and carrying element passes through the heating section 24, the sterilization unit 80, the blow molding wheel 25 (wherein there is a unit composed of container and carrying element downstream of the blow molding wheel) and the transport units arranged in between, for example, the transfer star wheels illustrated. Separation of the unit can take place, for example, on the output side of the blow molding machine, and the free carrying elements can then be supplied for a renewed use thereof in a return transport path 81. A further sterilization unit 82 which subjects the carrying elements to complete sterilization can be arranged on said return transport path 81.

In particular in the case of an interlocked arrangement of a blow molding machine with a filler and/or closer, the invention also permits a variant embodiment in which the unit composed of container and carrying element is transferred by the blow molding machine to the filler and/or to the closer and passes as a unit through the filler and/or the closer.

Alternative closure devices according to the invention can be formed without a holding or carrying function. In this case, the workpieces are carried, for example, by tongs or other suitable holding devices, while the closure device, as described, accessibly closes an interior of the workpieces and is connected only to the workpiece, but does not have a substantial carrying or holding function, if any at all, for the workpiece, but rather is limited to the closure and lock function.

The invention claimed is:

1. A method for handling workplaces which are sterile at least ire regions and have a fillable inner volume, the method comprising the steps of: connecting each of the workpieces to a respective closure device; guiding the workplaces and the respective closure devices through a plurality of treatment stations, wherein one of the treatment stations is a sterilization unit; and, in at least one of the treatment stations, moving a treatment member through a passage opening in the closure device into an inner volume of the workplace, wherein the passage opening in the closure device is closed by a closure element that opens when the treatment member moves therethrouqh and closes again when the treatment member is removed, wherein the closure device closes the inner volume of the workpiece in relation to an external region in a sealed manner.

2. The method as claimed in claim 1, wherein. the workpieces are preforms composed of a thermoplastic material for producing blow molded containers which are sterile at least in regions, and/or containers produced in a blow-molding manner from preforms.

3. The method as claimed in claim 2, including guiding the preforms through the plurality of treatment stations of a blow molding machine.

4. The method as claimed in claim 3, including guiding the preforms through a heating unit in which the preforms are conditioned thermally for a blow molding process, and/or through a blow molding station in which the preforms are blow molded to form containers, and/or through inlet, discharge and/or transfer star wheels in which the preforms and/or the containers are transported.

5. The method as claimed in claim 4, wherein each of the preforms is connected to the respective closure device before sterilization takes place in the sterilization unit, in particular wherein, in the sterilization unit, a sterilization member is guided through the passage opening in the closure device in order to introduce a sterilization agent into the inner volume of the preform.

6. The method as claimed in claim 5, wherein the connection takes place upstream of the heating unit, wherein the connection is released at the earliest after departure from the blow molding station.

7. The method as claimed in claim 6, wherein the connection is released only after the blow molded container has been filled with a filling material.

8. The method as claimed in claim 2, wherein the workpiece has a mouth opposite a closed base, a handling ring and an external thread which is arranged on a mouth side of handling ring, wherein the connection of the closure device to the workpiece takes place at the handling ring and/or at the external thread.

9. The method as claimed in claim 8, wherein sealing of the closure device to the workpiece takes place at the handling ring of the workpiece and/or at an end of the external thread that faces away from the mouth.

10. The method as claimed in claim 8, including using a chemical sterilization agent that is guided along the external thread after passing through the inner volume.

11. The method as claimed in claim 10, wherein the chemical sterilization agent is hydrogen peroxide in a flowable state of aggregation.

12. The method as claimed in claim 1, wherein the closure devices are guided in a circuit, wherein the closure devices revolve in a first portion of the circuit in a manner connected to a workpiece and revolve in. a second portion of the circuit without a workpiece, wherein in the second portion of the circuit without a workpiece, sterilization. of the closure devices takes place.

13. The method as claimed in claim 12, wherein sterilization is carried out using a sterilization agent or a sterilizing radiation.

14. The method as claimed in claim 1, wherein the closure devices are carrying devices that carry or hold the workpieces.

* * * * *